United States Patent
Zainy

(10) Patent No.: US 9,326,488 B2
(45) Date of Patent: May 3, 2016

(54) TOY TETHER

(71) Applicant: Haider Zainy, Broomfield, CO (US)

(72) Inventor: Haider Zainy, Broomfield, CO (US)

(*) Notice: Subject to any disclaimer, the term of this patent is extended or adjusted under 35 U.S.C. 154(b) by 41 days.

(21) Appl. No.: 14/251,577

(22) Filed: Apr. 12, 2014

(65) Prior Publication Data

US 2015/0150219 A1    Jun. 4, 2015

Related U.S. Application Data

(60) Provisional application No. 61/910,175, filed on Nov. 29, 2013.

(51) Int. Cl.
*A01K 29/00* (2006.01)
*A01K 15/02* (2006.01)

(52) U.S. Cl.
CPC ......... *A01K 15/025* (2013.01); *Y10T 29/49826* (2015.01)

(58) Field of Classification Search
CPC .................................................. A01K 15/025
See application file for complete search history.

(56) References Cited

U.S. PATENT DOCUMENTS

| | | | |
|---|---|---|---|
| 2,698,598 A | 1/1955 | Hadley | |
| 5,111,771 A | 5/1992 | Mathews | |
| 5,357,904 A | 10/1994 | Takahashi | |
| 5,474,032 A * | 12/1995 | Krietzman et al. | 119/708 |
| 5,924,387 A * | 7/1999 | Schramer | 119/708 |
| 6,474,260 B1 | 11/2002 | Shultz | |
| 7,056,236 B2 * | 6/2006 | Ohle | 473/423 |
| 7,115,051 B2 * | 10/2006 | Hansberry | 473/423 |
| 7,226,373 B2 * | 6/2007 | Arenas | 473/417 |
| 8,640,653 B2 * | 2/2014 | Cook et al. | 119/708 |
| 8,900,075 B2 * | 12/2014 | Gu | 473/423 |
| 8,944,011 B2 * | 2/2015 | Kirschbaum | 119/708 |
| 2005/0272533 A1 * | 12/2005 | Ohle | 473/423 |
| 2006/0162672 A1 | 7/2006 | Dokken | |
| 2008/0196676 A1 * | 8/2008 | Kim et al. | 119/707 |
| 2010/0304900 A1 * | 12/2010 | Gu | 473/419 |

FOREIGN PATENT DOCUMENTS

GB        2316888 A        3/1998

* cited by examiner

*Primary Examiner* — Kristen C Hayes
(74) *Attorney, Agent, or Firm* — Lawrence Lambelet

(57) ABSTRACT

The present invention is a tether for a toy with a safety feature to prevent entanglement of an animate object, such as a pet or a child, the feature comprising a stiff proximal element. Innovative features provide both for interactive play and containment of the play area by coupling an elastic cord with a rope of selected length.

11 Claims, 5 Drawing Sheets

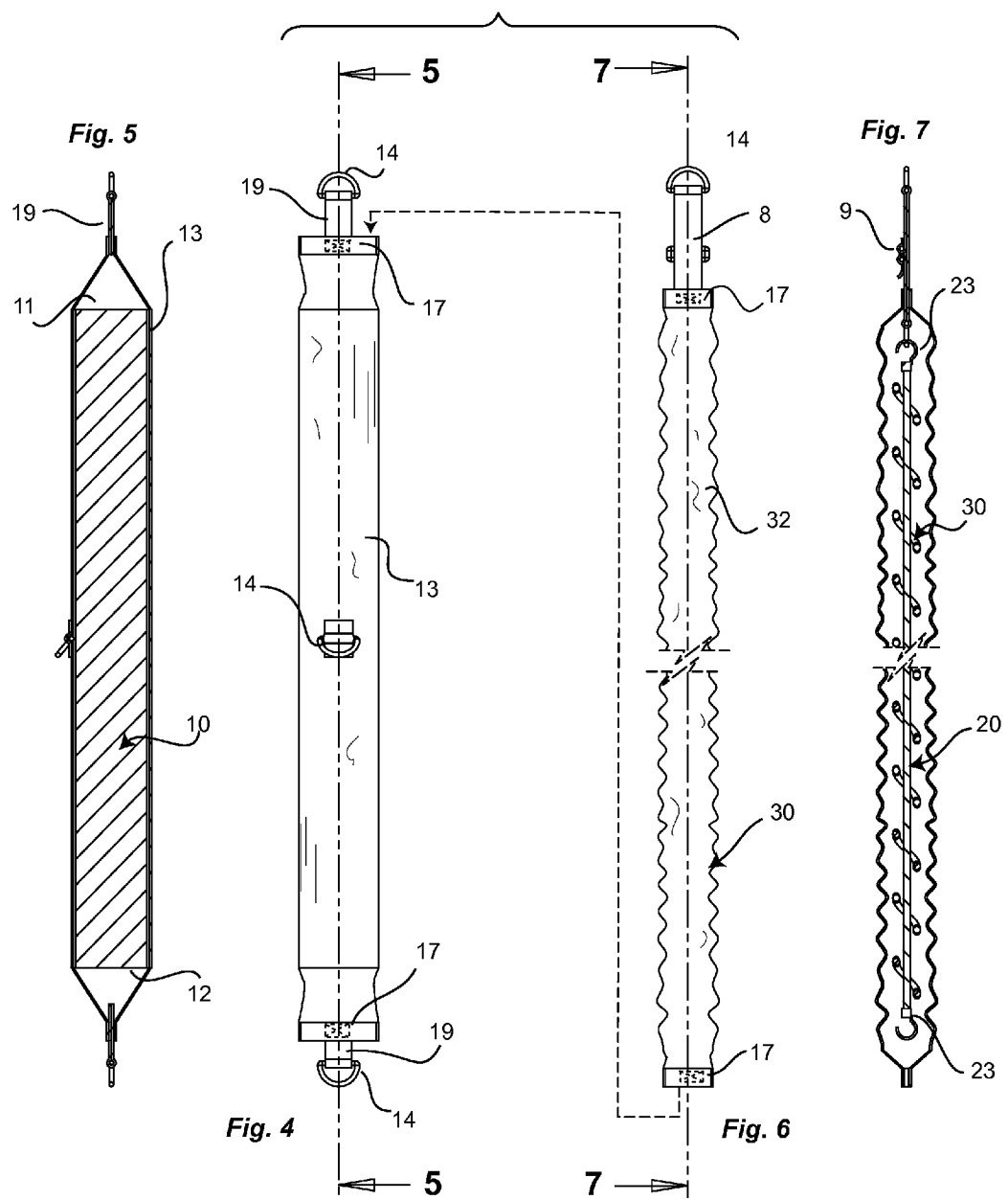

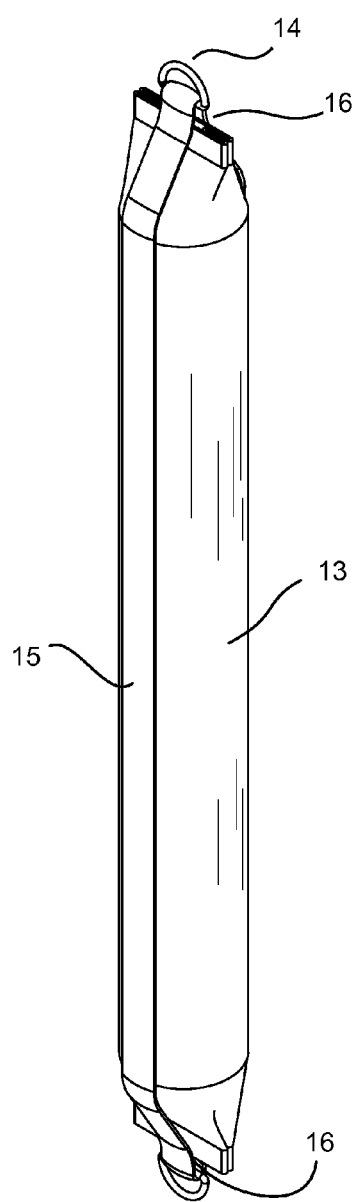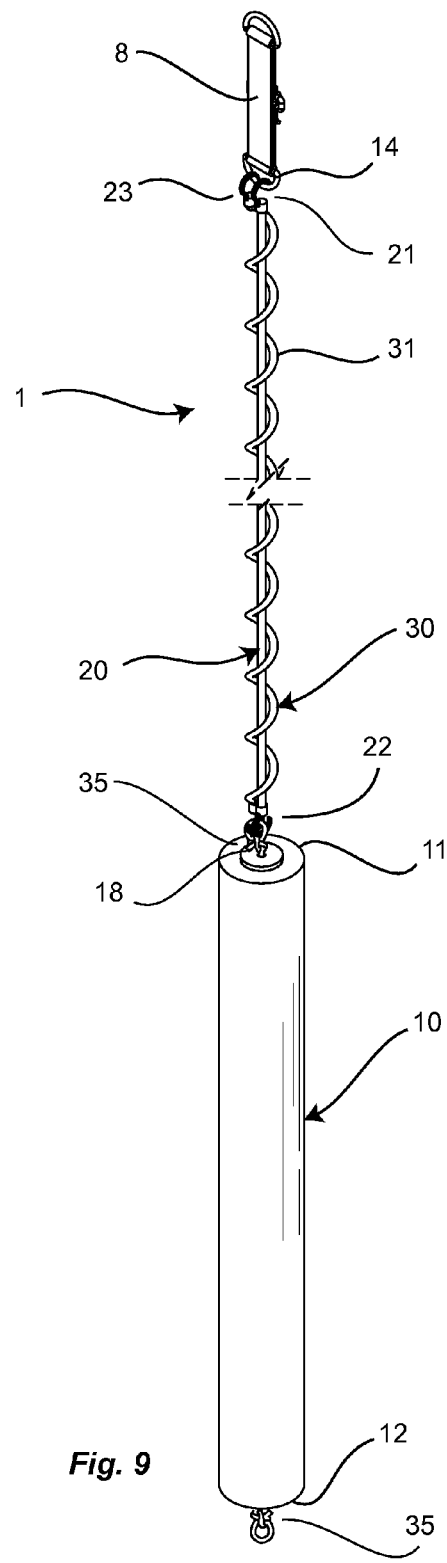
Fig. 8
Fig. 9

TOY TETHER

CROSS-REFERENCE TO RELATED APPLICATIONS

This is a U.S. Non-Provisional Patent Application claiming priority to U.S. Provisional Application No. 61/910,175, filed on Nov. 29, 2013, which is incorporated herein by reference in entirety.

FIELD OF THE INVENTION

This invention relates to toys, and more particularly to safety toys for pets.

BACKGROUND OF THE INVENTION

Toys are used to entertain and exercise pets, notably dogs and cats. In a particular instance, such as when the pet owner is away from the home, the pet may become restless and exhibit destructive behavior. It is useful, therefore, to provide a device to absorb the pet's energy and attention. It is also useful to contain the play area to a certain zone within the owner's domicile, or within the immediate housing of the pet.

Prior art devices, such as tethers, have been developed for such a purpose. In some cases, such tethers are comprised of inelastic cording, such as rope, which limit the scope of area to a discrete playing zone. In other cases, the tethers are comprised of elastic means, which provide for interaction with the pet, but fail, because of the elastic means, to restrain the play to discrete territorial limits. What is missing in the art field is a tethering device which both provides for interactive play, and, therefore, sustained interest on the part of the pet, and simultaneously for restraint, which zones the playing area to within selected boundaries.

All tethers for pet toy use are necessarily flexible in order to encourage play. The property of flexibility, however, also creates a safety issue. The pet might become entangled with the tether and suffer bodily, or emotional, harm. In a worst case scenario, a child in the domicile might be accidentally trapped, or even hung, by the tether. A safety feature to prevent entanglement is desirable for all domestic-use tethers, particularly when suspended from overhead anchor points.

The present invention answers the unfilled needs in the current state of art for a flexible, restrained and safe tether for home use, where it is desirable to zone interactive play and where both child and pet safety are issues of concern.

SUMMARY OF THE INVENTION

It is, therefore, an object of the present invention to provide for resilient, interactive, play for a household pet. It is a further object to restrain the play to discrete territorial limits over a playing surface. It is a further object to prevent entanglement, by human or animal, with any flexible tethering means. It is further object to make both a resilient means and a restraint means scalable to adjust for size and weight of the pet, for territorial extent of the play zone, and for the suspension distance from an anchor point. It is a further object to construct a tethering device from readily available, and inexpensive, materials and components using quotidian methods and means.

These objects, and others to become hereinafter apparent, are embodied in a tether with safety features for use with a toy, the tether including, in a first part, a stiff bat having a longitudinal extent, a distal end and a proximal end, the proximal end being removably attached to the toy. In a second part, the tether includes at least one elastic cord suspending the bat and toy over a playing surface, the elastic cord having a distal end anchored at a point of elevation over the playing surface and a proximal end attached to the distal end of the bat. In a third part, the tether includes a means for limiting extension of the elastic cord. In a preferred embodiment, the means for limiting extension of the elastic cord is a rope anchoring the stiff bat to the point of elevation and having a length defined by the chosen zone of safe play. The elastic cord provides for responsive interaction with an animate object, such as a pet, playing with the toy on the playing surface, while the longitudinal extent and stiffness of the bat prevent the elastic cord from harmfully wrapping around the animate object, or any part thereof. Additionally, the means for limiting extension limits access to the toy to a zone of safe play on the playing surface.

In an alternate embodiment, a method of safely tethering a toy includes the steps of anchoring a distal end of an at least one elastic cord to a point of elevation over a playing surface; attaching a proximal end of the elastic cord to a distal end of a stiff bat having longitudinal extent; attaching a proximal end of the stiff bat to a toy; and limiting the extension of the elastic cord to a zone of safe play on the playing surface.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings and the following detailed description, in which like reference characters designate the same or similar parts throughout the several views, and wherein:

FIG. 4 is an elevation view of the fabric jacketing with attachment rings;

FIG. 5 is a section view of FIG. 4 taken along the lines 5-5 and showing the bat within;

FIG. 6 is a broken elevation view of the crumple-folded sleeve with the adjustable strap;

FIG. 7 is a section view of FIG. 6 taken along the lines 7-7 and showing the elastic cord and rope within;

FIG. 8 is a perspective view of the fabric jacketing showing the encircling web belt;

FIG. 9 is a perspective view of an alternate embodiment with the rope extending through a bore in the bat.

DETAILED DESCRIPTION OF THE PREFERRED EMBODIMENT

Throughout the description and the claims, the term "elastic cord" will be taken to refer to any resiliently flexible cordage including, but not limited to, "bungee" cord, "shock" cord, surgical tubing and stretch webbing. The term "rope" will be taken to refer to any non-extensible flexible cordage including, but not limited to, rope, wire and strapping.

Figure 1:
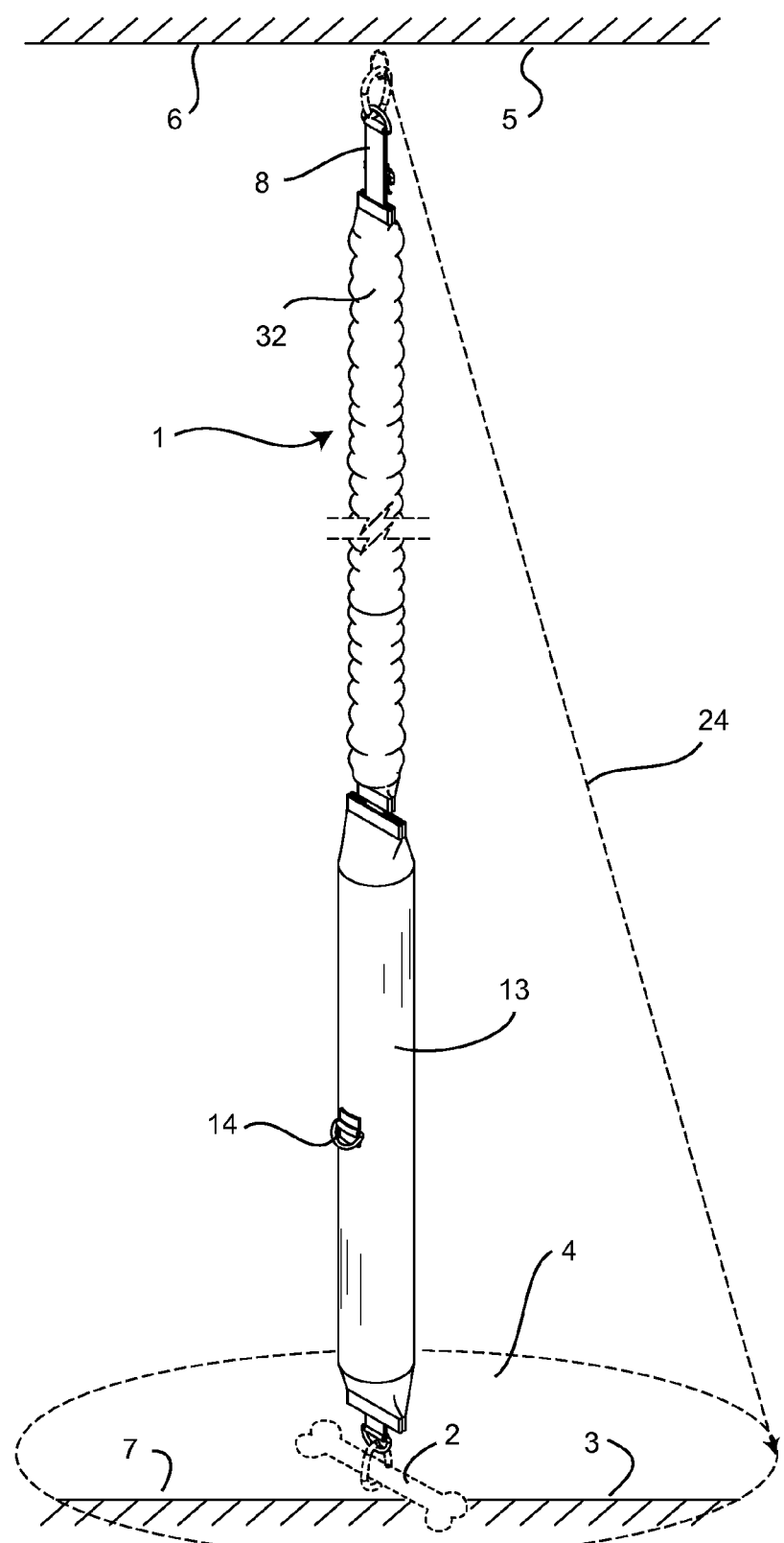
FIG. 1 is a perspective view of the invention in an environmental setting.

As best shown in FIGS. 1 and 9, the constituent parts of a safety tether 1 for use with a toy 2 comprise a stiff bat 10, an elastic cord 20 and a means for limiting extension 30 of the elastic cord 20. A proximal end 22 of the elastic cord 20 is connected to a distal end 11 of the stiff bat 10. In the preferred embodiment, the connection is removable, and can be facilitated by any known means, such as hooks 23 interposed with attachment rings 14. A distal end 21 of the elastic cord 20 is connected to a point of elevation 5. In the preferred embodiment, the point of elevation 5 is a ceiling 6 in a room designated for play activity. Alternatively, the point of elevation 5 may be the top of cage which houses a pet, a soffit-like structure, or an overhanging beam. A proximal end 12 of the stiff bat 10 is removably attached to the toy. The tether 1 hangs from the point of elevation 5 to position the toy 2 at, or just above, a playing surface 3. In the preferred embodiment, the playing surface 3 is a floor 7 of the room, or may, alternatively, be any lower surface. Preferably, the unextended length, or the drop distance, of the tether 1 is approximately 5-10 feet.

In the preferred embodiment, the means for limiting extension 30 is a rope 31 having a length greater than the unextended elastic cord 20. Preferably, the rope 31 extends from an anchor point at the point of elevation 5 to the distal end 11 of the bat 10, essentially coupling with the elastic cord 20. When the elastic cord 20 is extended during play with an animate object (not shown), such as a pet, an extended length 24 of the tether 1 is limited by the length of the rope 31, considering that the bat 10, as the linking part, remains non-extensible. In the preferred embodiment, the extended length 24 is approximately thirteen feet. The extended length 24 may be considered the hypotenuse of a triangle (FIG. 1) the base of which defines the radius of a zone of play 4. In this manner, the play area is limited to selected, safe and discrete territorial boundaries.

Figure 2:
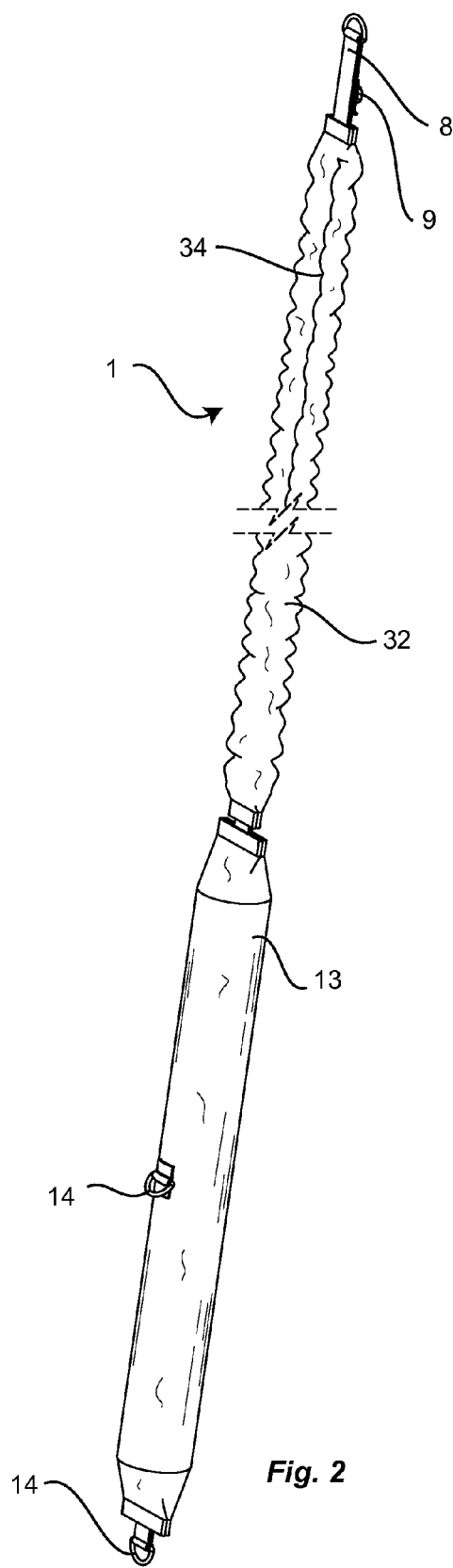
FIG. 2 is a perspective view of the invention showing the crumple-folded sleeve.

The elastic cord 20 and the rope 31 may be covered, in a relaxed state, by a crumple-folded sleeve 32, as shown in FIGS. 1, 2 and 6. The crumple-folded sleeve 32 provides a means for containing the excess of rope 31, not to mention providing a cosmetic look to the elastic section of the tether 1. The crumple-folded sleeve 32 extends, by means of the folds, to the length of the rope 31. The crumple-folded sleeve 32 may contain a longitudinal slit 34 (FIG. 2), preferably in an overlapped configuration, to give access to the interior thereof. The overlap may be secured with hook and loop tape, known commercially as Velcro®. Such access might be used to change-out components, or, otherwise, to add additional elastic cords 20. The resistance of the tether 1, and, consequently, the reactivity of play to the animate object, can be adjusted by adding or subtracting elastic cords 20, or by changing-out the tension-strengths of the cords. In an alternate embodiment of the means for limiting extension 30, the rope 31 may be eliminated and replaced by the crumple-folded 32 acting alone. In such a case, an unfolded length 33 (not shown), representing the extended length of the crumple-folded sleeve 32, defines the extended length 24. The crumple-folded sleeve 32 may be comprised of rip-stop nylon, or other lightweight, foldable material.

The stiff bat 10 comprises the principle safety feature. The stiff bat 10, best shown in FIG. 5, has, as a significant property, a high bending modulus in the longitudinal direction. The purpose is to virtually eliminate entanglement for a distance above the playing surface 3 that might be accessible to the animate object. Accordingly, in the preferred embodiment, the stiff bat 10 is comprised of a rigid polymer foam cylinder in a 2-4 inch diameter by 2-3 foot length. An example of such a foam cylinder, termed a "Funnoodle", is available at aquatic sports stores. The foam cylinder may be reinforced on its axis by inserting a 0.5-1.0 inch PVC pipe.

Referring to FIGS. 2-4 and 8, the stiff bat 10 may be enclosed by a fabric jacket 13. The fabric jacket 13 provides a means for including attachment devices, not to mention providing a cosmetic look to the inelastic section of tether 1. In the preferred embodiment, the attachment devices are the attachment rings 14, which are sewn, by means of attachment straps 19 and sewing patches 17 (FIG. 4), onto each end of the fabric jacket 13. The attachment rings 14 may also be attached by rivets, or other known means of making attachment. In a particular embodiment, the attachment rings 14 are sewn onto the body of the fabric jacket 13 between the ends to provide additional attachment points for other toys 2, or for objects of opportunity. Attachment rings 14 can also be sewn onto the crumple-folded sleeve 32 to provide exterior attachment devices for the quick addition of elastic cords 20. The fabric jacket 13 may be comprised of canvas duck material, or other high-tensile fabric material. In an alternate embodiment, the fabric jacket 13 may be encircled by a web belt 15, and sewn thereabout, leaving attachment loops 16 at each end (FIG. 8). The web belt 15 provides reinforcement in the tension direction.

Figure 3:
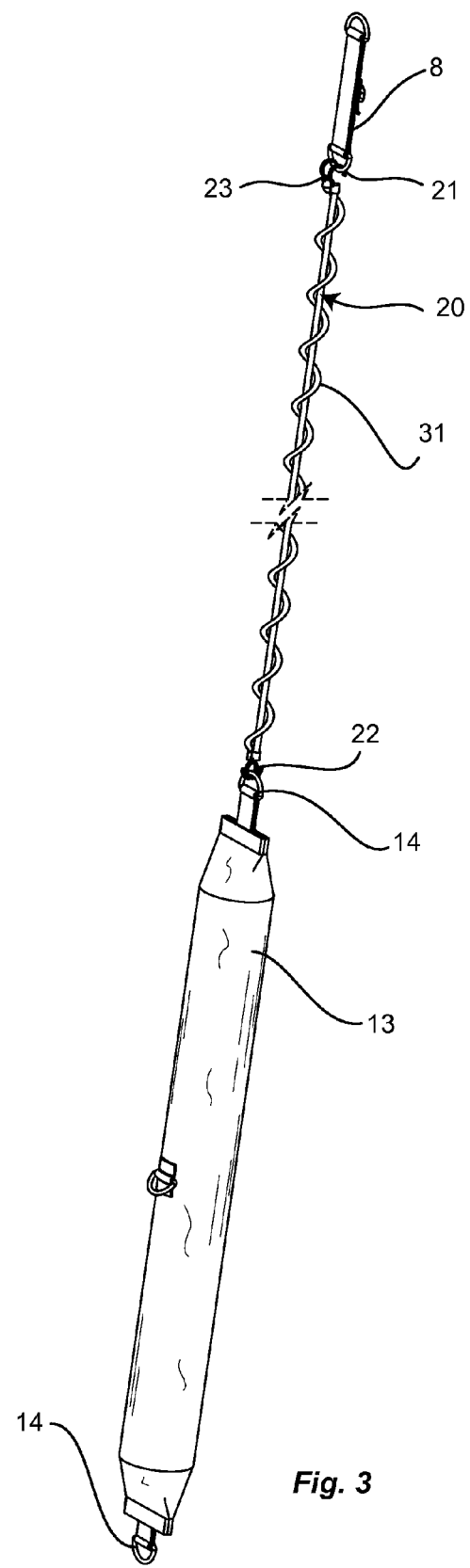
FIG. 3 is a perspective view of the invention showing the elastic cord and rope with the crumple-folded sleeve removed.
Figure 10:
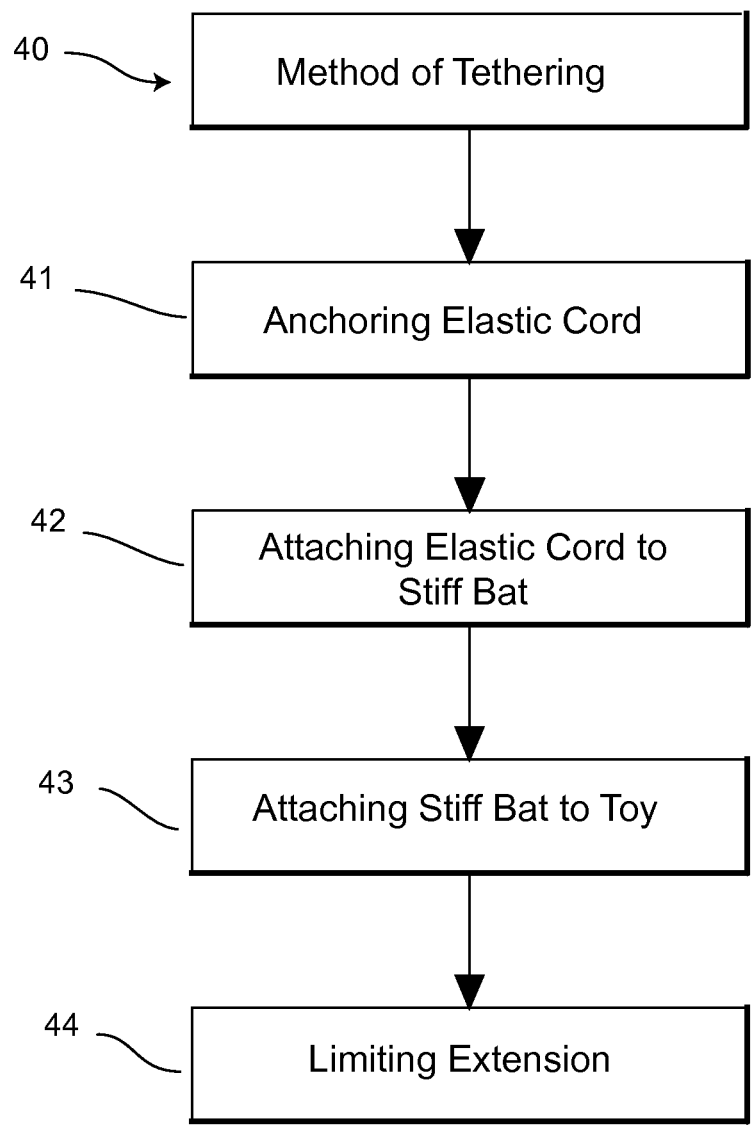
FIG. 10 is a chart of the method steps.

The length of tether 1 may be adjusted by an adjustment strap 8 positioned between the distal end 21 of the elastic cord 20 and the point of elevation 5, as shown in FIGS. 3, 6 and 9. In the preferred embodiment, the adjustable strap 8 includes a buckle 9, or other known adjustment means, for changing its length. In a particular embodiment, the adjustment strap is sewn to extend into the interior of the crumple-folded sleeve 32 (FIG. 7) and includes attachment rings 14 at each end.

In another alternate embodiment of the means for limiting extension 30, the rope 31 may extend through the bat 10 with the fabric jacket 13 eliminated. In the particular embodiment illustrated in FIG. 9, the rope 31 passes through a bore in bat 10, and a section of it secures itself at each end thereof by knotted loops 35 bearing on washers 18 having apertures smaller than the knots.

In an alternate embodiment of the invention, a method of safely tethering a toy 40 comprises:
Step 41: Anchoring the distal end 21 of the at least one elastic cord 20 to the point of elevation 5 over the playing surface 3;
Step 42: Attaching the proximal end 22 of the at least one elastic cord 20 to the distal end 11 of the stiff bat 10 having longitudinal extent;
Step 43: Attaching the proximal end 12 of the stiff bat 10 to the toy 2; and
Step 44: Limiting the extension of the at least one elastic cord 20 to a zone of safe play 4 on the playing surface 3.

It is to be understood that the invention is not limited in its application to the details of construction, to the arrangements of the components and to the method of using set forth in the preceding description or illustrated in the drawings. For example, the stiff bat might be any lightweight, longitudinally-rigid object, such as a carbon fiber tube. In extreme simplification, the stiff bat may even be a section of the rope 31, which has been rendered stiff by impregnation. Also, it is to be understood that the phraseology and terminology employed herein are for the purpose of the description and should not be regarded as limiting.

What is claimed is:
1. A tether with safety features for use with a toy, comprising:
a stiff bat having a longitudinal extent, a distal end and a proximal end, said proximal end removably attached to the toy;
at least one elastic cord suspending the bat and toy over a playing surface, said at least one elastic cord having a distal end anchored at a point of elevation over the playing surface and a proximal end attached to the distal end of the bat; and a rope anchoring the stiff bat to the point of elevation and having a length defined by a zone of safe play on the playing surface;

whereby, the elastic cord provides for responsive interaction with an animate object playing with the toy on the playing surface, while the longitudinal extent and stiffness of the bat prevent the at least one elastic cord from harmfully wrapping around the animate object, or any part thereof, and the rope limits access to the toy to the zone of safe play.

2. The tether of claim 1, wherein the stiff bat is comprised of lightweight polymer foam.

3. The tether of claim 1, wherein the stiff bat is covered by a fabric jacket.

4. The tether of claim 3, wherein the fabric jacket comprises attachment rings sewn onto the ends thereof to facilitate removable attachments thereto.

5. The tether of claim 4, wherein the fabric jacket further comprises attachment rings sewn between the ends thereof for the removable attachment of additional objects.

6. The tether of claim 5, further comprising a web belt longitudinally encircling and supporting the fabric jacket, and extending over the ends thereof to form attachment loops.

7. The tether of clam 6, wherein the web belt includes attachment rings between the attachment loops for the removable attachment of additional objects.

8. The tether of claim 1, wherein a proximal end of the rope is attached to the proximal end of the stiff bat by threading a bore there through.

9. The tether of claim 1, further comprising an adjustment strap to customize the drop of the tether.

10. A method of safely tethering a toy, comprising the steps of:

anchoring a distal end of an at least one elastic cord to a point of elevation over a playing surface;

attaching a proximal end of the at least one elastic cord to a distal end of a stiff bat having longitudinal extent;

attaching a proximal end of the stiff bat to a toy; and limiting the extension of the at least one elastic cord to a zone of safe play on the playing surface by means of a rope anchoring the stiff bat to the point of elevation and having a length defined by the zone of safe play;

whereby, the at least one elastic cord provides for responsive interaction with an animate object playing with the toy on the playing surface, while the longitudinal extent and stiffness of the bat prevent the at least one elastic cord from harmfully wrapping around the animate object, or any part thereof.

11. A tether with safety features for use with a toy, comprising:

a stiff bat having a longitudinal extent, a distal end and a proximal end, said proximal end removably attached to the toy;

at least one elastic cord suspending the bat and toy over a playing surface, said at least one elastic cord having a distal end anchored at a point of elevation over the playing surface and a proximal end attached to the distal end of the bat; and a crumple-folded sleeve over the at least one elastic cord anchoring the stiff bat to the point of elevation and having an unfolded length defined by a zone of safe play on the playing surface;

whereby, the elastic cord provides for responsive interaction with an animate object playing with the toy on the playing surface, while the longitudinal extent and stiffness of the bat prevent the at least one elastic cord from harmfully wrapping around the animate object, or any part thereof, and the crumple-folded sleeve limits access to the toy to the zone of safe play.

* * * * *